A. W. SANGSTER.
OZONE MACHINES.
No. 194,729. Patented Aug. 28, 1877.
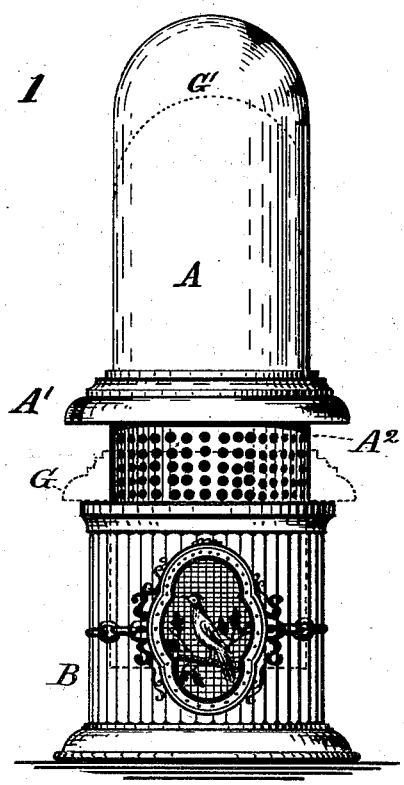
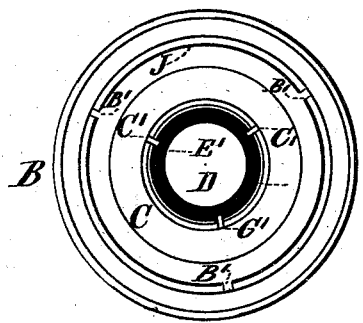
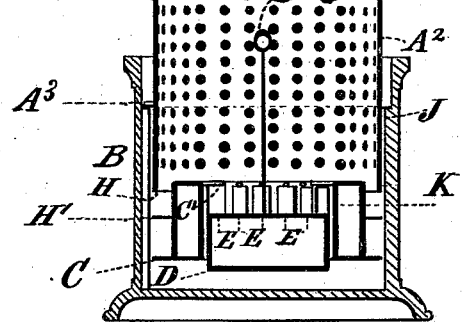
Witnesses.
C. L. Pond.
F. P. Stiker.
Inventor.
Amos W. Sangster
Per, James Sangster
Atty.

UNITED STATES PATENT OFFICE.

AMOS W. SANGSTER, OF BUFFALO, NEW YORK, ASSIGNOR OF ONE-HALF HIS RIGHT TO EDWARD M. JEWETT, OF SAME PLACE.

IMPROVEMENT IN OZONE-MACHINES.

Specification forming part of Letters Patent No. 194,729, dated August 28, 1877; application filed June 16, 1877.

*To all whom it may concern:*

Be it known that I, AMOS W. SANGSTER, of the city of Buffalo, in the county of Erie and State of New York, have invented certain new and useful Improvements in Ozone-Machines, which improvements are fully set forth in the following specification and accompanying drawings, in which—

Figure 1 is a side elevation, Fig. 2 a plan or top view of the lower part of the machine, and Fig. 3 represents a vertical central section through the lower part of the machine, also through the floats and a part of the perforated portion.

The object of my invention is to furnish a simple and reliable machine for producing ozone by the slow combustion of phosphorus partly immersed in water.

It consists, first, in the combination of a float for holding and supporting the phosphorus, and a thin rod or pin (one or more) of glass or other material not acted upon by the acid. The object of the float is to carry the phosphorus up as fast as it is consumed, and the rods or pins to prevent it from being forced too far out of the water.

A perforated plate or a properly-woven fabric of some suitable material would answer a similar purpose.

The second part of my invention consists in the combination of a float for supporting the phosphorus and a supplemental float for holding the glass rods or pins, or the equivalent thereof, as above mentioned, the object of the first float being to carry the phosphorus up as fast as it is consumed; the second, to prevent it from rising too high out of the water by means of the aforementioned rods or their equivalents; and the object of the two floats combined is to maintain the proper immersion of the phosphorus, though the level of the water may be varied.

The third part of my invention consists in a simple combination and arrangement of the upper part of the device, which is provided with one or more pins, and the lower part having grooves to receive the said pins, whereby the machine may be conveniently shut up, and the consumption of phosphorus instantly arrested, when required, as will be more clearly hereinafter shown.

In the drawings, A represents a glass dome fastened to the ring $A^1$ and perforated tube $A^2$. These may be all formed of one piece of glass, or each of different materials. The perforated portion may be made of porcelain or clay, and may be, if desired, covered with a piece of cloth or other woven fabric saturated or dipped in any well-known material for purifying ozone.

To the part $A^2$ is connected one or more pins, $A^3$, (shown in Fig. 3,)—one pin would answer but more are better—arranged so as to fit into the grooves $B'$ of the vessel B for holding the water, floats, and phosphorus.

C D represent a suitable arrangement of the floats. C is the outer float, upon which is fastened the thin rods or pins $C'$, hereinbefore mentioned, for limiting the distance the phosphorus shall project out of the water. The outer float is made in the form of a hollow ring, and float D is made so as to move easily within it; but the shape may be varied. C may be square or of any other form, having an opening of suitable shape to receive the float D, or two or more floats, C, provided with rods or pins $C'$, or their equivalents, may be arranged around the float D; but this would be more complicated, and would not answer the purpose so well.

The floats are thin hollow vessels of glass, or other material suitable for the purpose. A solid float might be used, such as cork, pumice-stone, or anything sufficiently light for the purpose; but a hollow float is easily made. Its weight can be regulated so as to adapt it perfectly to the purpose designed.

E, in Fig. 3, represents the sticks of phosphorus, which is the usual form in which it is used; but it may be made and used in the form of a ring, as shown at $E'$, Fig. 2, or in the form of a round cake to fit the top of the float, and may be perforated, if required. The phosphorus is connected to the float in any of the well-known ways.

F, Fig. 3, represents a handle by which the floats can be easily lifted out when required.

If necessary, one or more springs may be connected either to the perforated part $A^2$ or to the inside of the water-vessel B, so as to produce friction enough to hold $A^2$ at any point of its adjustment, up or down, so that by this means the phosphorus may be forced down more or less into the water, if required, and thereby counteract the increasing lightness of the phosphorus as it burns away. Or a spiral or screw-thread may be made on the inside of B, into which the pins or a thread on $A^2$ may be fitted, so that its height may be regulated by turning it.

The operation of the invention is easily understood from the drawing. Water being put into the vessel B so that its level will reach, for instance, to K, Fig. 3, and the floats and phosphorus arranged, as shown in Fig. 3, and the part $A^2$ being adjusted, as in Fig. 1, the machine is ready for operation.

When it is desired to arrest the action of the machine all that is necessary to do is to turn the part A until the pins $A^3$ come over the grooves B', when it can be easily let down to the position shown by the dotted lines G G'; or this operation may be performed in any other equivalent way by means of a screw or springs.

The bottom H of the part $A^2$, by coming in contact with a flange, H', or pins on the float C, forces them all together, with the phosphorus, down under the water, thereby closing everything and arresting the action or combustion of the phosphorus, so that the machine may be kept in that condition for any length of time until required for use, when it may be easily readjusted by lifting the dome A and turning it slightly so that the pins $A^3$ may rest upon the ledge or projection J. (Shown in Figs. 2 and 3.)

I claim as my invention—

1. The combination of the parts A $A^1$ $A^2$ provided with the pins $A^3$, with the vessel B, provided on the inside with the grooves B' and ledge J, for the purposes specified.

2. In an ozone-machine, the combination of a float, D, and a series of rods or pins, C', arranged above said float and level of the water, so as to limit the distance the phosphorus shall project out of the water, as described.

3. The float C, provided with pins or rods C', in combination with the float D, for holding the phosphorus, for the purpose of limiting the distance the phosphorus shall project above the water at various levels of the same.

AMOS W. SANGSTER.

Witnesses:
 JAMES SANGSTER,
 C. L. POND.